US007877330B2

(12) United States Patent
Siegel et al.

(10) Patent No.: US 7,877,330 B2
(45) Date of Patent: *Jan. 25, 2011

(54) METHOD AND SYSTEM FOR MANAGING ACCESS TO MEDIA FILES

(75) Inventors: Hilliard B. Siegel, Seattle, WA (US); Charles Gordon, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,676

(22) Filed: Oct. 19, 2009

(65) Prior Publication Data

US 2010/0036748 A1 Feb. 11, 2010

Related U.S. Application Data

(63) Continuation of application No. 10/832,090, filed on Apr. 26, 2004, now Pat. No. 7,627,530.

(51) Int. Cl.
*G06F 7/00* (2006.01)
*G06F 17/30* (2006.01)
*G06F 21/00* (2006.01)
*G06Q 10/00* (2006.01)
*H04N 7/16* (2006.01)

(52) U.S. Cl. .................. 705/57; 707/781; 707/783; 707/784; 726/26; 726/27; 726/29

(58) Field of Classification Search ............... 707/781, 707/783, 784; 705/57, 59; 726/26, 27, 29
See application file for complete search history.

(56) References Cited

U.S. PATENT DOCUMENTS 6,385,596 B1 5/2002 Wiser (Continued)

FOREIGN PATENT DOCUMENTS

EP 0715243 A1 6/1996

(Continued)

OTHER PUBLICATIONS

Macavinta, C., "Recording Industry Sues Music Start-Up, Cites Black Market," CNET News.com, Dec. 7, 1999, 4 pages [retrieved Oct. 9, 2006].

(Continued)

*Primary Examiner*—John R. Cottingham
*Assistant Examiner*—Mariela D Reyes
(74) *Attorney, Agent, or Firm*—Christensen O'Connor Johnson Kindness PLLC

(57) ABSTRACT

Access to selected content in different file formats can be managed by conducting, in a single purchase transaction, a user purchase of access rights that allow a user to acquire multiple copies of the same selected content in media files having different file formats. An authorization signal is communicated to a content provider or multiple content providers who did not conduct the purchase transaction. The authorization signal contains information that allows the content provider or the multiple content providers to authorize the user to acquire multiple copies of the same selected content in different file formats without requiring the user to conduct multiple transactions. Each copy of the selected content acquired from a content provider is in a media file having a different file format.

20 Claims, 6 Drawing Sheets

U.S. PATENT DOCUMENTS

| | | |
|---|---|---|
| 6,389,403 B1 | 5/2002 | Dorak, Jr. |
| 6,609,105 B2 | 8/2003 | Van Zoest et al. |
| 6,641,037 B2 | 11/2003 | Williams |
| 6,704,733 B2 | 3/2004 | Clark |
| 6,826,593 B1 | 11/2004 | Acharya |
| 6,850,901 B1 | 2/2005 | Sykes |
| 6,976,003 B1 | 12/2005 | Hamor et al. |
| 7,152,046 B2 | 12/2006 | Wang |
| 7,222,162 B2 | 5/2007 | Lee |
| 7,389,247 B2 | 6/2008 | Pestoni |
| 2002/0091584 A1 | 7/2002 | Clark |
| 2002/0138354 A1 | 9/2002 | Seal |
| 2002/0147840 A1 | 10/2002 | Mutton |
| 2003/0009424 A1 | 1/2003 | Ta |
| 2003/0018543 A1 | 1/2003 | Alger |
| 2003/0033331 A1 | 2/2003 | Sena |
| 2003/0097340 A1 | 5/2003 | Okamoto |
| 2003/0177073 A1 | 9/2003 | Ogai |
| 2003/0225641 A1 | 12/2003 | Gritzmacher |
| 2004/0078808 A1 | 4/2004 | Herledan |
| 2004/0093229 A1 | 5/2004 | Plain |
| 2004/0172367 A1 | 9/2004 | Chavez |
| 2005/0004873 A1 | 1/2005 | Pou |
| 2005/0119977 A1 | 6/2005 | Raciborski |
| 2005/0197964 A1 | 9/2005 | Duggan |

FOREIGN PATENT DOCUMENTS

| | | |
|---|---|---|
| EP | 0715244 A1 | 6/1996 |
| EP | 0715245 A1 | 6/1996 |
| EP | 0715246 A1 | 6/1996 |
| EP | 0715247 A1 | 6/1996 |

OTHER PUBLICATIONS

Borland, J., and E. Hansen, "Napster Lawyers Prep Defense in Music Battle," CNET News.com, Jul. 3, 2000, 3 pages [retrieved Oct. 9, 2006].

Supplementary European Search Report mailed May 26, 2009, issued in corresponding Application No. EP 05740210.9, filed Apr. 26, 2005, 10 pages.

METHOD AND SYSTEM FOR MANAGING ACCESS TO MEDIA FILES

CROSS-REFERENCE TO RELATED APPLICATION

This application is a continuation of U.S. patent application Ser. No. 10/832,090, filed Apr. 26, 2004, the disclosure of which is incorporated by reference herein in its entirety.

BACKGROUND

The widespread use of the Internet has greatly enhanced the way users acquire and use electronic media. There are now many different types of media players that allow users to locate, obtain, and play media files that contain music, movies, computer programs, pictures, games, and other content. For instance, a user may search for a particular song at the Apple Music Store, which is found at http://www.applemusic.com, and purchase rights that allow the user to download a media file containing the song. Once the user obtains the media file, the user may play the song on a compatible media player application, such as the iTunes® player by Apple of Cupertino, Calif. Other media player applications that allow users to purchase and play media files include the RealOne™ player by RealNetworks, Inc., of Seattle, Wash.; and the Windows Media Player™ by Microsoft Corp. of Redmond, Wash.

While existing systems have enhanced the way users acquire and use media, existing systems present some limitations. One limitation is caused by the fact that specific media player applications are limited to certain types of file formats. For instance, if a user obtains a media file in a Windows® media format, e.g., a .WMA file, for use in the Windows Media Player™, the obtained media file may be incompatible with other media players, such as the RealOne™ player or the iTunes® player. Although it is possible for a user to convert an original media file having a Windows® media format into a format that is compatible with another player, such a remedy is not always desirable because the conversion process causes some degradation in the quality of the recording.

The above-described limitation caused by incompatible file formats is more apparent when existing media players are required to manage rights to a copyright-protected work contained in a media file. For instance, if a user purchases a copyright-protected audio file from the Apple Music Store, the user receives the audio file in a particular format, such as Apple's new AAC format. Copyright protection of the content contained in the audio file is preserved since the proprietary AAC format cannot be played by other media players. In addition, the compatible media player application, the iTunes® player, limits the number of copies that can be produced from the original media file. Thus, if the user would like to play the purchased song on another media player application, such as the Windows Media Player™, the user would have to purchase rights to the same song from another provider having an audio file format that is compatible with the Windows Media Player™. Although it may be possible for the user to convert the AAC file to another format suitable for another media player, the quality of the converted audio file would be subject to some degradation. In addition, conversion of an AAC file to another file format may violate one or more copyrights that apply to the purchased file. As a result of the above-described limitations, consumers of copyright-protected media files may not have the ability to utilize more than one media player application for certain media files. In addition, users may be forced to purchase multiple copies of a song if they wish to utilize more than one media player application.

Accordingly, the prior art is lacking an effective method and system for efficient distribution and management of media files. In addition, the prior art is lacking an effective method and system for managing access rights to copyrighted works contained in media files.

SUMMARY

This summary is provided to introduce a selection of concepts in a simplified form that are further described below in the Detailed Description. This summary is not intended to identify key features of the claimed subject matter nor is it intended to be used as an aid in determining the scope of the claimed subject matter.

System and methods are provided for managing access rights to media files communicated over a network. In accordance with at least one embodiment, a system method are configured to manage user access rights to works, also referred to herein as "content," that are contained in media files and typically subject to copyright. Instead of providing access to a single media file having a particular format, purchasers of content are authorized to acquire a number of different media files having different file formats for the same content without requiring the purchaser to pay multiple times for the copies of the content. By providing controlled access to content stored in multiple file formats, users may readily acquire media files that can be played on a number of desired media player applications. Many other benefits, such as an improved consumer pricing arrangement, may also result from such management of access rights for content.

In at least one embodiment, a user may purchase rights to access media files of selected content that may include, for example, a song, album, movie, etc. Once the user purchases rights to access media files of the selected content, information that identifies the user and information that describes the selected content is communicated to one or more content providers. The information may be in the form of a token that signifies the user's right to access the selected content. By receiving this information, each content provider can verify that the user is authorized to access a number of files that contain the selected content. The user may then directly contact any one of the content providers to acquire media files that contain the selected content. A user's right to access the media files with the selected content may be communicated to the content providers at the time of the user's purchase transaction or at a later time, e.g., when a user contacts a particular content provider and requests access to the media files. In other embodiments, a content provider may allow a user to access media files as a result of an authorization signal sent in response to an authorization request. Access to a media file may include, but is not limited to, downloading an actual media file containing the selected content, accessing a non-recordable data stream containing the work, accessing a recordable data stream containing the work, etc.

As a result, the user's access to the selected content is not limited to a single proprietary file format merely because one content provider is limited to such a file format. Embodiments described herein allow users to obtain the selected content in more than one file format by accessing different media files, possibly from different content providers, containing the content. Among many other benefits, access to different content providers allows users to readily access a number of different formats of media files containing the selected content without requiring users to pay multiple times for copies of the same content. Thus, users do not incur an increased cost simply because they desire to play the selected content on a number of different media players.

Thus, according to an embodiment, provided herein is a computer-implemented method for managing access to selected content that is stored in electronic media files having different file formats. The method is performed under control of instructions that are executed by one or more computer processors in a computing system and includes conducting, in a single purchase transaction, a user purchase of access rights that allow a user to acquire multiple copies of the same selected content in media files having different file formats. The method further includes communicating an authorization signal to a content provider server of a content provider who did not conduct the purchase transaction. The authorization signal contains information that allows the content provider to authorize the user to acquire, from the content provider server, multiple copies of the same selected content without requiring the user to conduct multiple transactions to purchase access rights for the multiple copies of the selected content. Each copy of the selected content acquired from the content provider server is in a media file having a different file format.

Prior to communicating the authorization signal, an authorization request may be received. The authorization signal may be communicated to the content provider server in response to receiving the authorization request. The authorization request may identify the user and the selected content.

In at least one embodiment, the authorization request is received from a content provider. In an alternative embodiment, the authorization request is received from a media player application executing on a client computer associated with the user. In regard to the latter, the method may further comprise identifying the content provider as having the selected content in a media file format that is compatible with the media player application and communicating the authorization signal to the identified content provider.

Also described herein is a tangible computer-readable medium having computer-executable instructions stored thereon for managing access to selected content stored in different file formats. The instructions, if executed, cause a computing device to conduct, in a single purchase transaction, a user purchase of access rights that allow a user to acquire multiple copies of the same selected content in media files having different file formats. The instructions further cause the computing device to communicate an authorization signal to a content provider server of a content provider who did not conduct the purchase transaction, wherein the authorization signal contains information that allows the content provider to authorize the user to acquire, from the content provider server, multiple copies of the same selected content without requiring the user to conduct multiple transactions to purchase access rights for the multiple copies of the selected content. Each copy of the selected content acquired from the content provider server is in a media file having a different file format.

The instructions, if executed, may further cause the computing device to store transaction information associated with the user purchase in a memory; receive an authorization request from the content provider; and, in response to receiving the authorization request, retrieve the transaction information from the memory; determine whether the user is authorized to access the selected content based on the transaction information; and communicate the authorization signal to the content provider server.

The authorization request may contain data identifying the user and the instructions, if executed, may cause the computing device to use the data in the authorization request when determining whether the user is authorized to access the selected content.

Further described herein is another computer-implemented method for managing access to selected content that is stored in electronic media files having different file formats. The method includes conducting, in a single purchase transaction, a user purchase of access rights that allow a user to acquire multiple copies of the same selected content in media files having different file formats. The method further includes communicating an authorization signal to multiple content provider servers of multiple content providers who did not conduct the purchase transaction, wherein the authorization signal contains information that allows each of the multiple content providers to authorize the user to acquire, from at least one of the content provider servers, a copy of at least one media file containing the same selected content without requiring the user to conduct multiple transactions to purchase access rights for each copy of the selected content. Each copy of the selected content acquired from a content provider server is in a media file having a different file format.

Prior to communicating the authorization signal, an authorization request may be received and the authorization signal is communicated to the multiple content provider servers in response to receiving the authorization request.

The authorization request may identify the user and the selected content. In at least one embodiment, the authorization request is received from a content provider. Alternatively, the authorization request is received from a media player application executing on a client computer associated with the user. The authorization signal may be communicated to at least one content provider server storing the selected content in a media file format that is compatible with the media player application.

According to yet another embodiment, a computer system for managing access to selected content stored in electronic media files having different file formats comprises a transaction information database and a merchant server operated by a merchant in communication with the transaction information database. The merchant server is configured to conduct, in a single purchase transaction, a user purchase of access rights that allow a user to acquire more than one copy of the same selected content from more than one content provider, each acquired copy of the selected content being in a different file format, such that the user is not required to conduct multiple transactions to purchase access rights for each of the copies of the selected content in the different file formats. The merchant server is further configured to communicate an authorization signal to a plurality of content provider servers operated by content providers who did not conduct the purchase transaction, wherein the authorization signal contains information that allows each of the content providers to authorize the user to acquire, from at least one of the content provider servers, a copy of at least one media file containing the same selected content, wherein each copy of the selected content acquired from a content provider server is in a media file having a different file format. The content providers are each different than the merchant and the merchant does not operate the plurality of content provider servers.

The merchant server may be further configured to receive an authorization request for user access to a media file containing the selected content; evaluate transaction information in the transaction information database to determine whether the user is authorized to access the media file containing the selected content; and communicate the authorization signal to the plurality of content provider servers in response to determining that the user is authorized to access the media file.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following description provides an enabling description of a system, method and computer-readable medium for managing access to media files communicated over a network such as the Internet. The following description first provides an overview of a computing environment in which the present invention may be implemented. Following that, a description of a rights management routine is described and shown in accompanying flow diagrams. The illustrative examples described herein are not intended to be exhaustive or to limit the invention to the precise forms disclosed. Similarly, any process steps described herein may be interchangeable with other steps or several combinations of steps in order to achieve the same result.

Figure 1:
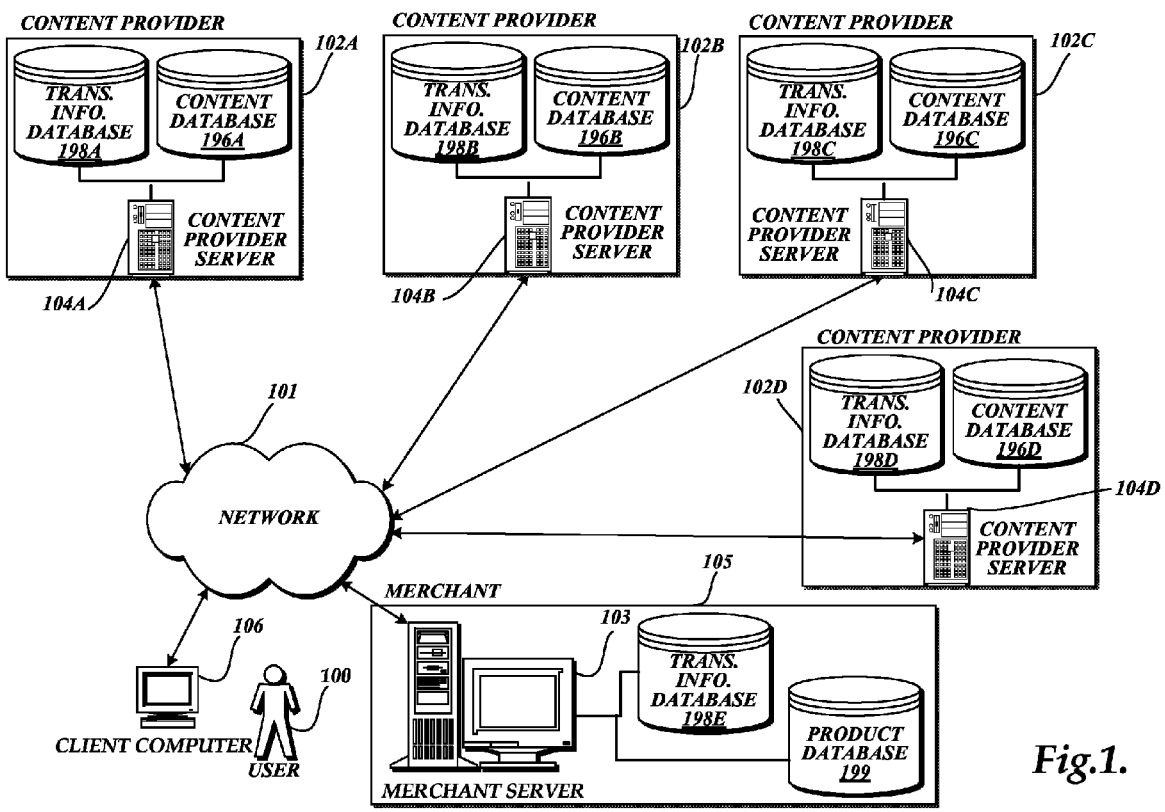
FIG. 1 is a pictorial diagram of a number of computers connected to a network, including a client computer and a number of servers for allowing a number of users to communicate via client-server software applications.

FIG. 1 provides an exemplary overview of a computing environment in which the invention may be implemented. The environment includes at least one client computer 106, a merchant server 103, and a plurality of content provider servers 104A, 104B, 104C, and 104D, interconnected by a communications network 101. The client computer 106 may be associated with a user 100, such as a consumer seeking to purchase rights to access one or more media files containing copyright-protected content. The merchant server 103 may be associated with a merchant 105, such as an on-line retailer offering to sell access rights to media content, i.e., copyright-protected works including music, movies, etc. The content provider servers 104A, 104B, 104C, and 104D may be associated with respective content providers 102A, 102B, 102C, and 102D, each of which may be a company that distributes media files containing copyright-protected works.

Each content provider may store media files containing copyright-protected works in content databases 196A, 196B, 196C, and 196D and distribute those media files in specific formats. For instance, if the first content provider server provider 102A is Microsoft, the media files stored in its respective content database 196A may include media files in Microsoft's WMA format. Similarly, if the second content provider 102B is RealNetworks, the media files stored in its respective content database 196B may include media files in RealNetworks' RA or RM format.

As described in more detail below, the user 100 may use the client computer 106 to purchase rights to access and/or obtain selected content and other products listed in a product database 199 maintained by the merchant 105. Purchase transaction information is stored in a transaction information database 198E of the merchant server 103. The transaction information, or a portion or representation thereof, is also communicated to one or more of the content providers 102A, 102B, 102C, and 102D and stored in a number of respective transaction information databases 198A, 198B, 198C, and 198D. The user may then contact the respective content provider(s) 102A, 102B, 102C, and 102D to obtain access to the media files containing the selected content. Using the information stored in the transaction information databases 198A, 198B, 198C, and 198D, each content provider can determine if the user 100 has rights to access particular media files stored in the content databases 196A, 196B, 196C, and 196D.

The client computer and the servers, depicted in FIG. 1, are configured to electronically communicate via the network 101. The network 101 may be a LAN or a larger network, such as a wide area network (WAN) or the Internet. The computing environment shown in FIG. 1 may be configured to communicate media files, Web page documents, commands, and data between the client computer and the servers. As will be appreciated by those skilled in the art and others, the computer systems shown in FIG. 1 provide a simplified example of one suitable environment for implementing the present invention. The present invention is not limited to this particular form of implementation.

When software formed in accordance with this invention is implemented in computer systems of the type illustrated in FIG. 1, the invention provides a way for users to purchase, download, and play media files. For instance, a user can purchase rights to access media files of selected content, which may include a song, album, movie, etc. Once the user purchases rights to access media files containing the selected content, information that identifies the user and the selected content is communicated to a plurality of content providers. By using the information that identifies the user and the selected content, each content provider can readily determine if the user is authorized to access the media files that contain the selected content. The user may directly contact any one of the service providers to access the media files that contain the selected content.

As a result of the above-described process, the user's access to the selected content is not limited to a single file format, even if an individual content provider distributes the selected content in a proprietary file format. If the user desires an alternative file format for use with another media player application, the user simply contacts another service provider to access a media file in the desired format. Among many other benefits, access to different content providers allows users to readily access a number of different formats of media files containing the selected content without requiring the user to pay multiple times for multiple copies of the same work. Thus, the user does not incur an increased cost simply because he or she desires to play, view, or execute the selected content on a number of different media players.

Figure 2:
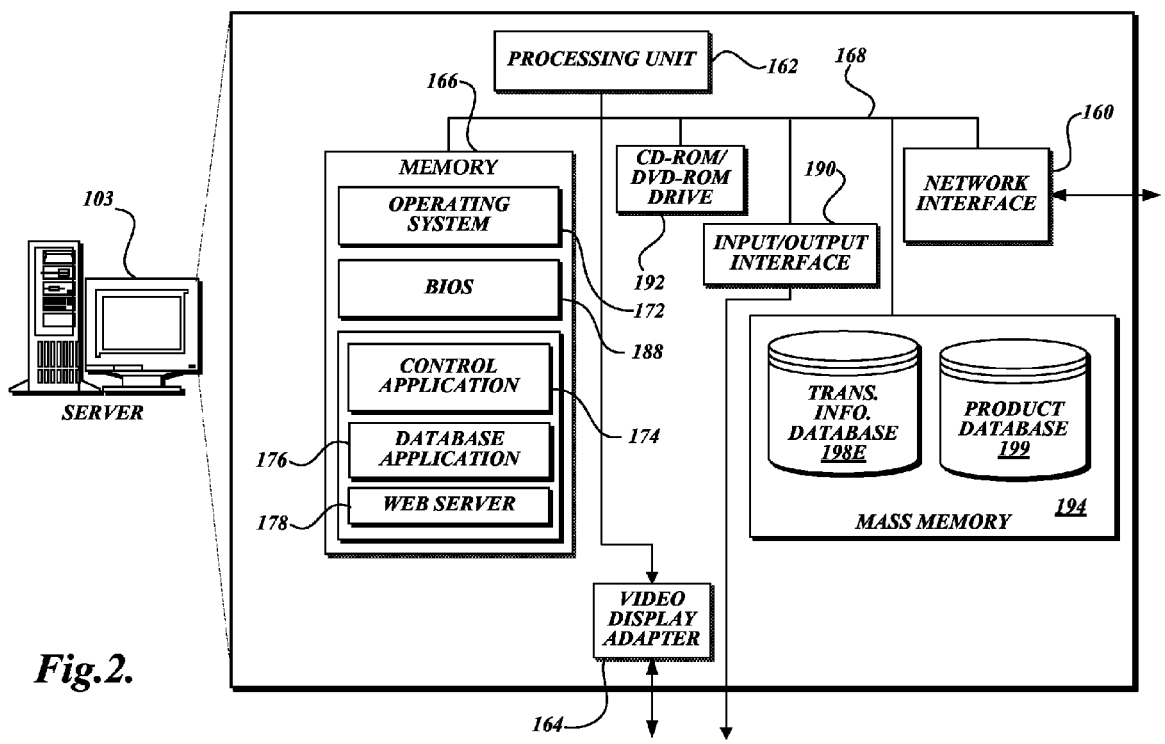
FIG. 2 is a schematic block diagram of an exemplary embodiment of one server depicted in FIG. 1.

FIG. 2 depicts an exemplary computer architecture of a server, such as the merchant server 103, suitable for use in the environment shown in FIG. 1. Those skilled in the art will appreciate that the server 103 may include many more (or fewer) components than those shown in FIG. 2. It is not necessary, however, that all of these generally conventional components be shown in order to disclose an enabling embodiment of the present invention. As shown in FIG. 2, the server 103 is connected to the network 101 (FIG. 1) via a network interface 160. Those of ordinary skill in the art will appreciate that the network interface 160 includes the necessary hardware and software to allow the server 103 to communicate with other computing devices connected to the network by the use of one or more suitable communication protocols, such as TCP/IP protocol.

The server 103 also includes a processing unit 162, a video display adapter 164, and memory 166, all communicatively connected together and to the network interface 160 by a bus 168. The memory 166 generally comprises RAM, ROM, and/or permanent memory, such as a hard disk drive, tape drive, optical drive, floppy disk drive, or combination thereof. The memory 166 stores an operating system 172 for controlling the operation of the server 103. As is known to those of ordinary skill in the art, the operating system may be formed by a general-purpose server operating system such as a Microsoft server operating system, UNIX or LINUX™. A binary input/output system ("BIOS") 188 for controlling the low-level operation of server 103 is also stored in the memory 166.

The memory 166 additionally stores the program code and data for providing network services that allow users to request, receive, and view information and data files stored at the server 103. Accordingly, the memory 166 may store a Web server application 178, which may be provided by any one of a number of commercially available software packages. The Web server application 178 comprises computer executable instructions that, when executed by the processing unit 162, generate configurable markup documents, such as the sample Web page shown in FIG. 4, which is described in more detail below. The Web server application 178 may be configured to communicate with a commercially available database application 176 and a control application 174 to facilitate various functions of the present invention, as described below.

The server 103 may further include an input/output interface 190 connected to the bus 168 for communicating with external devices, such as a mouse, keyboard, scanner, or other input devices not shown in FIG. 2. Likewise, the server 103 may include additional mass storage facilities, such as CD-ROM/DVD-ROM drive 192 and large capacity mass memory 194, such as a hard disk drive, tape drive, optical disk drive, or combination thereof, also connected to the bus 168. The server 103 may utilize the mass memory 194 to store several databases. In one embodiment, the mass memory 194 of the server 103 contains a transaction information database 198E, which stores information that identifies different users. The transaction information database 198E also stores information that identifies content, such as a specific songs, albums, movies, etc., purchased by each user. As described in more detail below, information stored in the transaction information database 198E of the server 103 is communicated for storage in other transaction information databases 198A, 198B, 198C, and 198D.

The content provider servers 104A, 104B, 104C, and 104D shown in FIG. 1 may take the form of any suitable computer architecture, such as the computer architecture illustrated in FIG. 2, if appropriate. The content provider servers 104A, 104B, 104C, and 104D may each include a network interface for communicating with other computing devices via the network 101. The network interface may be configured for use with any wired or wireless network connection, and may be used with any suitable communication protocol, such as the TCP/IP protocol. In general, each of the content provider servers 104A, 104B, 104C, and 104D includes a processing unit, a display, and a memory unit. The memory unit stores the program code necessary for operating a Web site and for providing access to media files stored in a memory device. In the particular embodiment described thus far, the memory unit of each content provider server 104A, 104B, 104C, and 104D may include the content databases 196A, 196B, 196C, and 196D for storing the media files, and the transaction information databases 198A, 198B, 198C, and 198D for storing transaction and user information received from the server 103.

The client computer 106 shown in FIG. 1 may take the form of any one of a number of different computer products. For example, the client computer 106 may include aspects of the computer architecture illustrated in FIG. 2, if appropriate. The client computer 106 may include a network interface for providing communication with the network 101. The network interface may be configured for use with any wired or wireless network connection and may be used with any suitable communication protocol, such as the TCP/IP protocol. In general, the client computer 106 includes a processing unit, a display, and a memory unit. The memory unit of the client computer 106 stores the program code necessary for operating the client computer 106. The memory unit of the client computer 106 may also store an application for browsing Web pages, such as Microsoft's Internet Explorer® Web browser.

The above-described computer systems store software programs that, when executed, implement aspects of the present invention. For illustrative purposes, the following describes an embodiment of the present invention that allows a user to access media files containing purchased content. In this example, the user purchases rights from a merchant. In turn, the merchant communicates information to one or more content providers enabling them to independently authorize access of at least one media file containing the selected content to the user. The user then accesses media files containing the selected content from one or more content providers. Although the illustrative example described herein depicts a Web-based implementation, those of ordinary skill in the art will appreciate that the scope of the invention may include other implementations regardless of the configuration, size, or form of the computing system.

Referring now to the flow diagram of FIG. 3A, the sequence diagram of FIG. 3B, and the pictorial diagram of FIG. 4, one exemplary embodiment of a media rights management routine 300 will now be described. The media rights management routine 300 begins at block 301 where the routine communicates a transaction Web page that enables a user to purchase rights to access media content. Generally described, the transaction Web page facilitates the communication of media information from a server 103 to a client 106, which allows the user to identify media content to be purchased. The transaction Web page also allows the user to select desired content and transact a purchase of the selected content with a merchant. It should be understood that a purchase transaction in the context of the present invention is not limited to transactions involving monetary transfer, but may involve any form of interaction in which access rights to selected media content are granted to a user.

Figure 4:
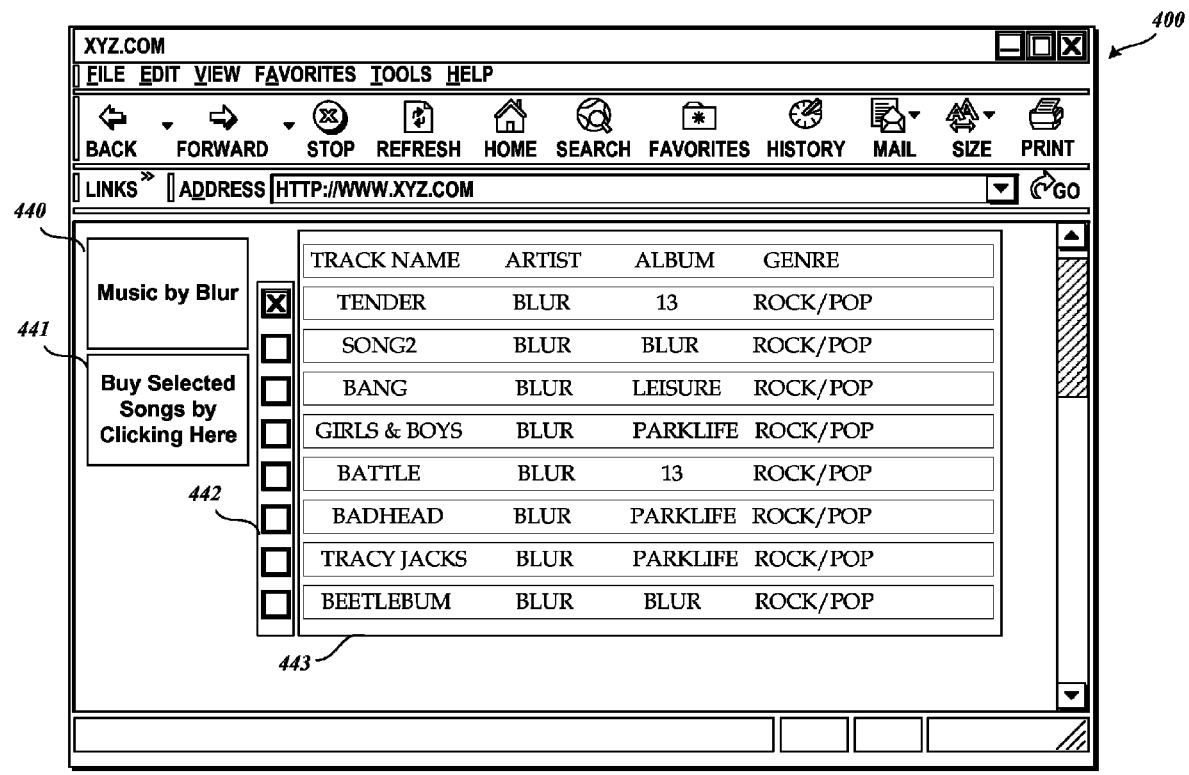
FIG. 4 is a pictorial diagram illustrating an exemplary Web page formed in accordance with one embodiment of the present invention.

For illustrative purposes, a sample transaction Web page 400 for use in the process of block 301 is shown in FIG. 4. The sample transaction Web page 400 comprises a first text field 440, which provides an overview of the content that is offered for sale. In this example, the first text field 440 generally describes the media content as "Music by Blur." The sample transaction Web page 400 also comprises a second text field 443, which provides a detailed description of the media content. In this example, the second text field 443 includes a list of songs. The list of songs describes each song's track name, artist, album, and genre. Although this illustration shows one example where specific types of information are used to describe the content offered for sale, other types of information suitable for describing the content falls within the scope of the present invention. One of ordinary skill in the art will appreciate that the information describing the media content may come from a database associated with the merchant, such as the product database 199 shown in FIG. 1.

The sample transaction Web page 400 also comprises control features that allow users to select and purchase rights to access selected content. In this example, the control features include a set of selection buttons 442 that allows users to select desired content and a control button 441 that allows users to complete a purchase transaction. User actuation of the control button 441 causes transaction information, which may include one or more items such as a purchase order describing the user and the selected content, to be communicated from the client 106 to the server 103. In one embodiment, the transaction information is arranged as a Uniform Resource Locator (URL) that the client 106 generates and transmits to the server 103. In other embodiments, the transaction information may be arranged and transmitted differently. As will be appreciated by one of ordinary skill in the art, a control application 174 of the merchant server 103 in FIG. 2 may operate in conjunction with existing electronic commerce software applications to implement the control features that complete the purchase transaction between the user and the merchant.

The transaction Web page 400 may also include other features. For instance, the transaction Web page may be configured with program code that allows users to conduct a keyword search for desired content. The transaction Web page may also be configured with other electronic commerce-related features, such as a login feature and a shopping cart feature. In one embodiment, a standard local login feature may be used (e.g., in which a user enters a user name and password that is checked against a local database of authorized users). Alternatively, a login feature of the transaction Web page may utilize one or more commercially-available universal login services, such as Microsoft's .Net Passport® service.

Returning to FIGS. 3A and 3B, the rights management routine 300 continues at block 303 where the client 106 communicates the transaction information to the server 103. In one embodiment, the transaction information identifies the selected content purchased by the user. For example, if the selected content includes a song, the transaction information may include general media information, such as the song's title, artist, album, genre, etc. Specifically referring to the example shown in FIG. 4, the selected content is the first song on the list, which is entitled "Tender." Thus, in this example, the transaction information may include: TRACK NAME=Tender; ARTIST=Blur; ALBUM=13; GENRE=ROCK/POP. Alternatively or in addition to the general media information, the transaction information may include a unique identifier associated with the selected content, such as a Universal Product Code (UPC) or the like.

In addition to information that identifies the selected content, the transaction information may also identify the user. In such an embodiment, a proprietary or public user identification code, such as one produced by Microsoft's .Net Passport® service, may be used. As will be appreciated by one of ordinary skill in the art, the process of block 303 may be implemented by any known communication method, such as those employing URLs to communicate transaction information from a client to a server. Although this description illustrates one specific example of a Web-based implementation of a purchase transaction, those of ordinary skill in the art will appreciate that implementations of the present invention may include other suitable systems configured to transact a purchase and sale between a user and a merchant.

Continuing at block 305, the rights management routine 300 stores the transaction information in a database associated with the merchant, such as the transaction information database 198E of FIG. 1. In one embodiment, the transaction information may be stored in a plurality of database records, where each database record identifies the user and the selected content purchased by the user. As will be appreciated by one of ordinary skill in the art, existing database programs may be used for implementing the process of block 305.

As shown in block 307, the rights management routine 300 communicates transaction information to a number of content provider servers. More specifically, transaction information is communicated from the merchant server 103 to one or more of the content provider servers 104A, 104B, 104C, and 104D. The transaction information communicated in block 307 includes a sufficient amount of information to allow each content provider server 104A, 104B, 104C, and 104D to determine if the user has obtained valid rights to access the selected content (e.g., by purchasing the selected content) that may be contained in media files stored in a local database of each content provider, such as the content databases 196A, 196B, 196C, and 196D. In one embodiment, the merchant server 103 may communicate transaction information that identifies the user and the selected content purchased by the user. The transaction information may be in the form of a token that uniquely identifies the user in the system, but includes measures to protect the privacy of the user. The process of block 307 may utilize any suitable method for communicating data between two computers, which may involve secured or encrypted data communications. The transaction information may be communicated to content providers at the time the user obtained valid rights to access the selected content (e.g., at the time of purchase) or at a later time (e.g., when the user contacts a particular content provider and requests access to the selected content).

In an example where a user has previously established one or more accounts with content providers 102A, 102B, 102C, and 102D, the user may log into the merchant server 103 and instruct the server 103 to associate those content providers with the user's purchase of content from the merchant 105. In one possible embodiment, the user may associate content providers in the server 103 by providing the merchant 105 the user's account name and password for each of the desired content providers. This information is communicated to the server 103 in a secure data communications link. In another embodiment, the user may simply provide an account name (or other account identification) for the desired content provider(s) that the server 103 may reference when communicating transaction information to the content providers. In yet another embodiment, user identification and authentication provided by a globally-recognized login service (such as Microsoft's .Net Passport® service) may be used. The user may further log into the server 103, as desired, to add or delete a content provider from their account with the merchant 105.

When the merchant 105 notifies the content providers listed in the user's account of the user's right to access media files containing particular content, the merchant server 103 sends a message (preferably via a secure data communications link) that contains the user's account name and password or some agreed representation thereof to the particular content provider, along with information identifying the content that the user is authorized to access. Using standard data communications protocols, each of the content providers receiving this message from the merchant 105 can recognize indicia in the transmission indicating the merchant server 103 as the source of the message. This indicia provides additional security confirming the authenticity of the merchant's message. As described below, each of the content providers receives the transaction information (or other authorization signal) from the merchant 105 and honors it by permitting the user to access the content in the content provider's server.

Alternatively, the merchant 105 may provide an application programming interface (API) that the content providers 102A, 102B, 102C, and 102D may use to enable their customers to log into the merchant server 103 from the content provider's Web site or client media player. Preferably, the login provided by the API would be a secure, Web-based service provided by the merchant server 103 so that communication of the user's identification and password with the merchant server 103 is hidden from the content providers. Once a user is logged into the merchant server 103, and information provided regarding the particular content provider 102A, 102B, 102C, or 102D, the merchant server 103 returns a token to the content provider which the merchant 105 and the content provider agree to represent the particular user. From then on, if the user purchases selected content from the merchant 105, the merchant server 103 communicates the user's unique token, along with an indication of the purchased content.

The transaction information may be communicated to each content provider server in response to an event or on a regular timed basis. For instance, the transaction information collected by the merchant server 103 may be periodically transmitted to each content provider server in response to the receipt of a control signal generated by a database synchronization program, timing program, etc. In an alternative embodiment, instead of communicating transaction information, the merchant 105 may communicate an authorization signal to one or more content provider servers allowing access to media files in the content provider's servers. Details of such an alternative embodiment are described below in regard to FIG. 5.

After the processing of block 307, the rights management routine 300 continues at block 309 where each content provider server 104A, 104B, 104C, and 104D stores the received transaction information. In the process of block 309, the received transaction information may be stored in a number of local databases associated with each content provider, such as the transaction information databases 198A, 198B, 198C, and 198D shown in FIG. 1. As a result of the process of block 309, the transaction information databases 198A, 198B, 198C, and 198D of each respective content provider 102A, 102B, 102C, and 102D, may have all or less than all of the media and user information stored in the transaction information database 198E of the merchant. Storage of the transaction information enables each content provider server to independently determine if individual users of the system have access rights to its stored content. After the processing of blocks 301-309, the user may directly contact the content providers to access media files containing the user's selected content.

Next, as shown in block 311, the user communicates a request to access a media file containing the selected content. In the process of block 311, the access request is sent from the client 106 to a server of an individual content provider, such as a server 104A, 104B, 104C, or 104D. A user may communicate an access request by using a commercially-available software application, such as a Web browser application or a media player application. The user may send the access request to a particular content provider that provides media files in a desired media format. For example, as shown in the sample of sequence diagram of FIG. 3B, if a user desires to play his or her purchased media content on an iTunes® media player, the user may send the access request to the third content provider server 104C to access a media file having a compatible media format, such as Apple's AAC format. Those of ordinary skill in the art will appreciate that a media player, such as the iTunes® media player, may be configured with program instructions that allow a user to log into a content provider and communicate an access request for selected content. Media players may also be configured to work with a universal login service, such as Microsoft's .Net Passport® service, to communicate an access request to a content provider. In one embodiment, the access request may contain information that identifies the user and the content requested by the user. Since the third content provider 104C has received transaction information from the merchant server 103, the third content provider 104C can readily determine if the user has obtained valid rights to access one or more media files containing the content described in the access request.

In response to receiving the access request, the routine continues at block 313 where the content provider server authorizes the access request. In the present example, the content provider server 104C determines if the access request contains information that corresponds with relevant transaction information stored in the transaction information database 198C. If the relevant transaction information indicates that the user identified in the access request has obtained rights to access the content identified in the access request, the access request is authorized.

Once the access request has been authorized, the rights management routine 300 continues to block 315 where the content provider server (in this example, the third content provider server 104C) provides access to a media file containing the selected content. In accordance with the present invention, access to a media file may include, but is not limited to, downloading an actual media file containing the selected content, accessing a non-recordable data stream containing the work, accessing a recordable data stream containing the work, etc. The format of the media file should be a file format that is compatible with the media player desired by the user. In this part of the process, the media file may be delivered by one of a number of known methods for downloading or streaming a media file. In addition, the media file may be communicated by the use of any known file transfer protocol. Additional disclosure of methods for communicating media and product information between client and server computers is included in U.S. Pat. No. 7,117,167, titled "SYSTEMS, METHODS, AND COMPUTER-READABLE MEDIA FOR CONTROLLING DELIVERY OF DIGITAL PRODUCTS TO USERS," filed Mar. 22, 2001, and issued Oct. 3, 2006, the disclosure of which is hereby incorporated by reference.

Figure 3A:
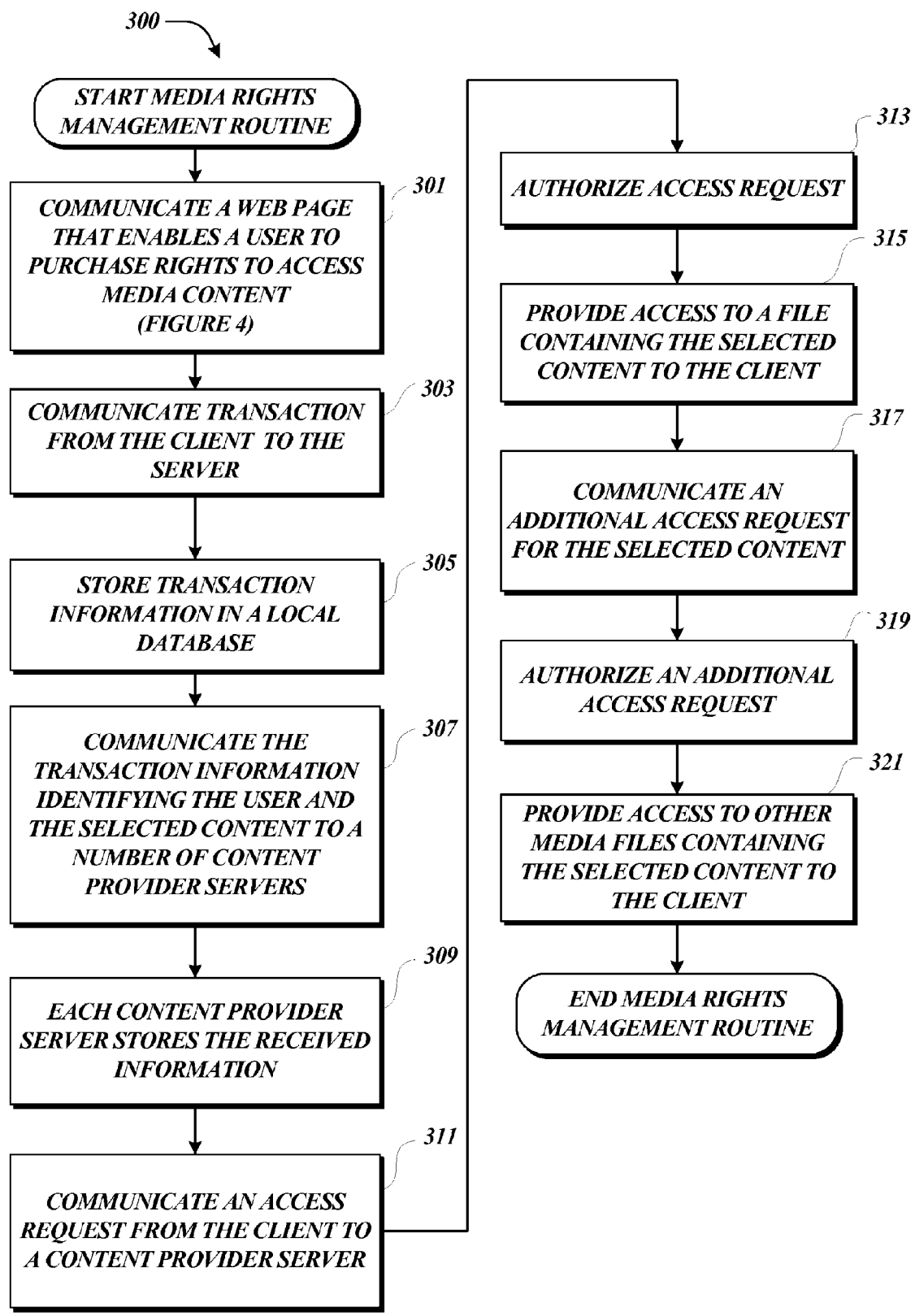
FIG. 3A is a flow diagram illustrating an exemplary embodiment of a rights management routine formed in accordance with one embodiment of the present invention.
Figure 3B:
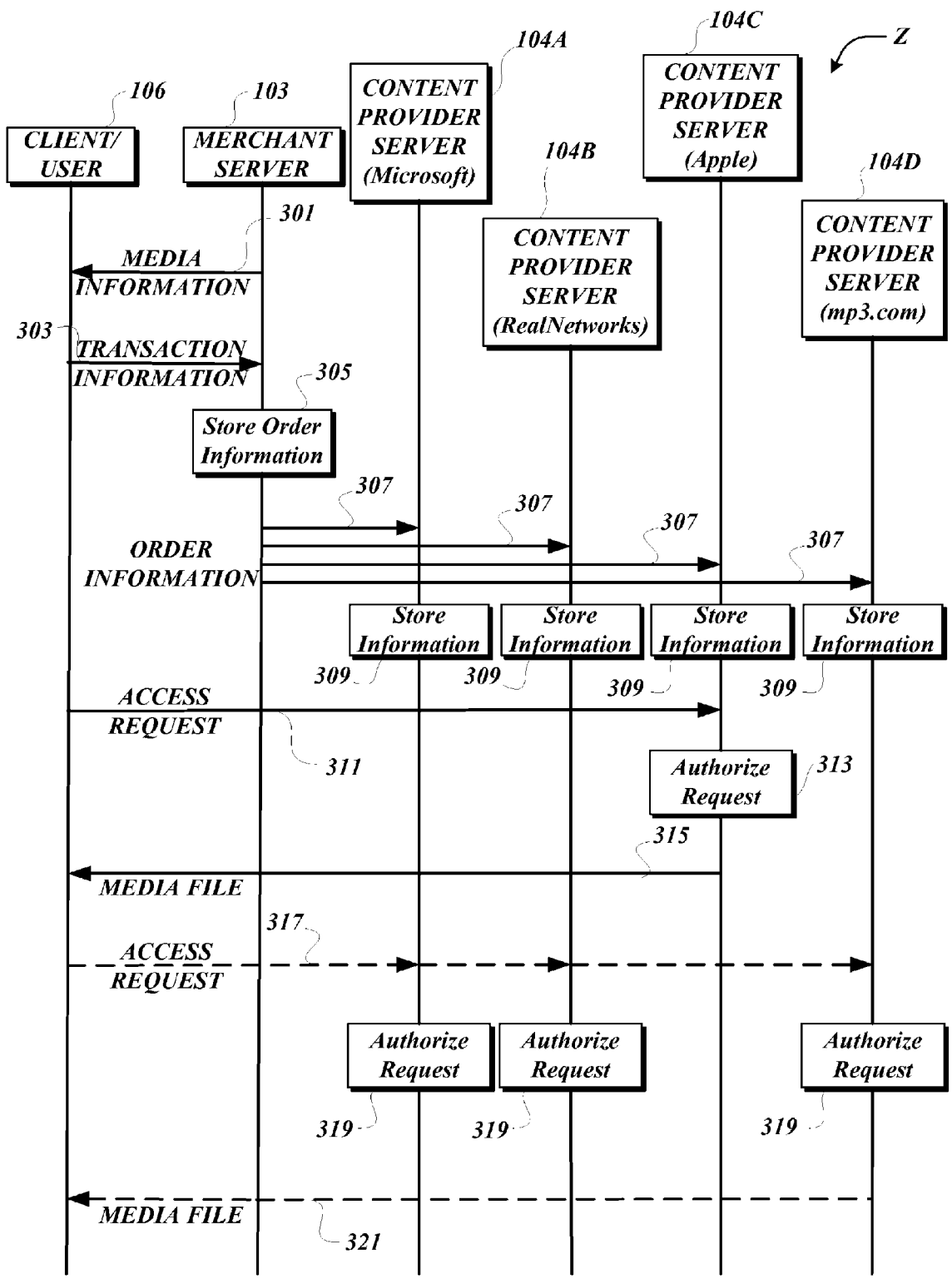
FIG. 3B is a sequence diagram showing the path of data communicated in the rights management routine shown in FIG. 3A.

Also shown in the subsequent process blocks 317-321 of FIGS. 3A and 3B, additional media files stored at other content providers can be accessed by the user. Thus, even after the user has accessed a first media file containing the selected content, the user may send an additional access request to another content provider to access other media files containing the selected content. This type of request may be invoked if the user desires a media file having a different format. For example, with reference to the example shown in FIG. 3B, the user may contact the first content provider 104A if the user desires media files that are compatible with a Microsoft media player; the second content provider 104B if the user desires media files that are compatible with a Real media player; or the fourth content provider 104D if the user desires media files in more generic formats.

As shown in process block 317 of FIGS. 3A and 3B, a subsequent access request may be communicated from the client 106 to one or more content provider servers 104A, 104B, 104C, or 104D. Similar to the first access request (block 311) communicated to provider server 103A, the subsequent access request 317 may be invoked by a commercially available software application, such as a Web browser application or a media player application. As shown in process blocks 319 and 321, the content provider servers respond to the receipt of the subsequent access request by authorizing the request and providing access to one or more media files containing the requested content. Process blocks 319 and 321 may be executed in a manner similar to the above-described processes of blocks 313 and 315. Upon the completion of the process of block 321, the rights management routine 300 terminates.

Figure 5:
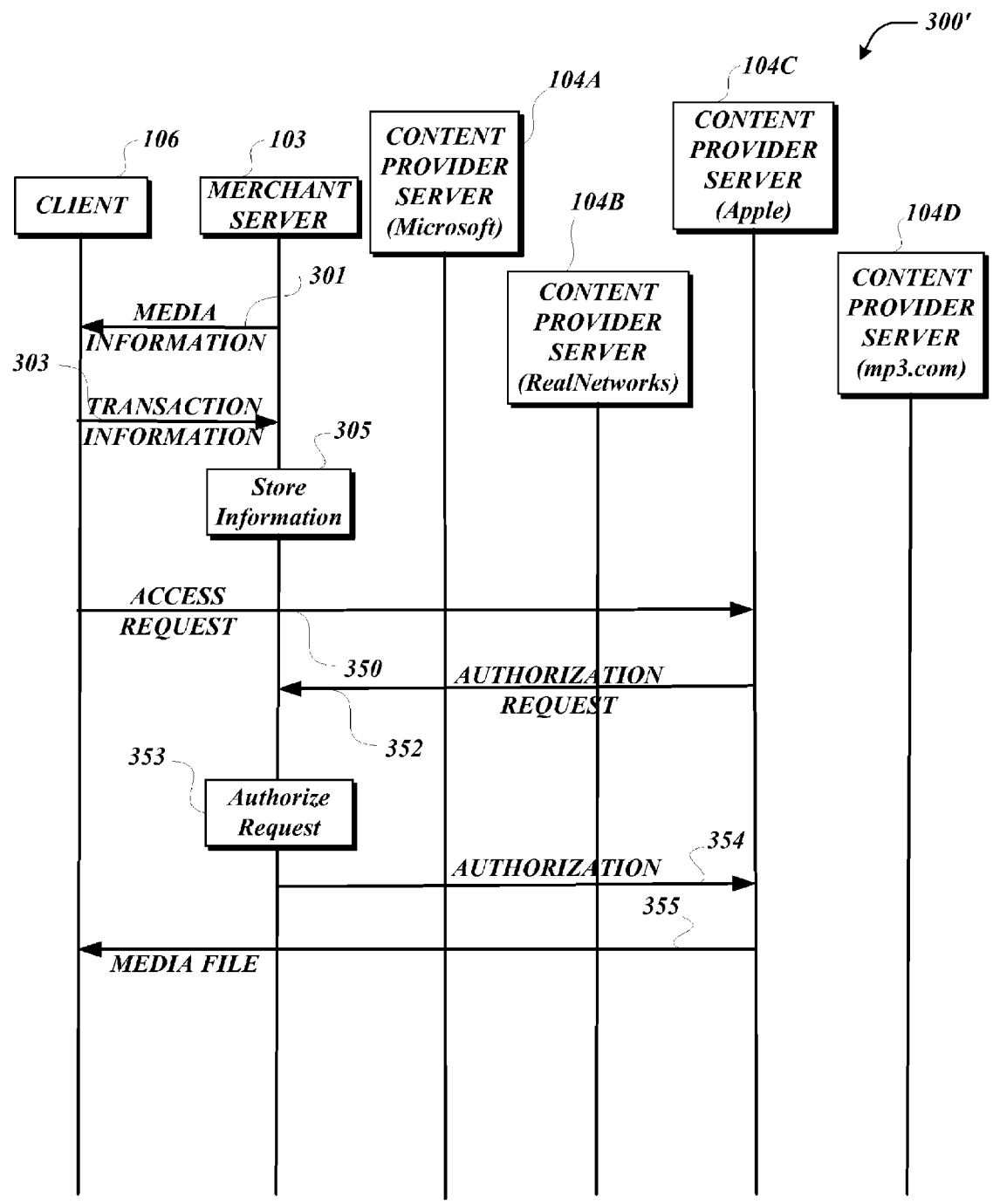
FIG. 5 is a sequence diagram showing the path of data communicated in a rights management routine formed in accordance with a separate alternative embodiment of the present invention.

FIG. 5 describes a separate alternative embodiment of a rights management routine. As described above, a merchant server can manage access to media files in other ways. FIG. 5 illustrates one alternative embodiment of a rights management routine 300', where an authorization signal for allowing access to media files is communicated to an individual content provider server.

In this alternative embodiment, the process of transacting a purchase of access rights to selected content may be carried out in a manner as described above. Thus, the communication of media information (301) and transaction information (303) are carried out in a manner similar to the above-described processes of blocks 301 and 303 shown in FIGS. 3A and 3B. After the purchase transaction is complete, the user associated with the client computer 106 may issue an access request to any one of the content providers. In the example shown in FIG. 5, the client computer 106 communicates an access request (350) to the third content provider server 104C. An access request (350) may include information that identifies the user and the selected content.

In response to receiving the access request, the third content provider server 104C communicates an authorization request (352) to the merchant server 103. In this embodiment, the authorization request (352) sends sufficient information so that the merchant server 103 can determine if the user is authorized to access the content identified in the access request (350). For instance, the authorization request (352) may include information that identifies the user and the selected content.

In response to receiving the authorization request (352), as shown in block 353, the merchant server 103 determines if the user is authorized to access the content identified in the access request (350). As described above, the merchant server 103 may analyze the received transaction information (303) to determine if the user has obtained rights to receive access to the selected content. If the merchant server 103 determines that the user may access the selected content, the merchant server 103 sends an authorization signal notifying the requesting content provider that the user may access one or more media files containing the content. The authorization signal may include any information that allows any one of the content provider servers to determine that the requesting user has access to the selected content. For instance, the authorization signal may include information that identifies the user and the selected content. Alternatively, the authorization signal may include information such as a reference to the access request (350) sent by the content provider, etc. As shown in communication line 354, the merchant server 103 communicates an authorization signal to the third content provider server 104C.

In yet another alternative, an authorization request may be received directly from a client computer associated with the user that is executing a media player application. An authorization signal is then communicated to a content provider in the user's account known to provide media files having a file format compatible with the user's media player application.

In yet another embodiment, the authorization request (352) may only contain sufficient information to uniquely identify the user. When the merchant server 103 receives an authorization request (352) from a content provider, it returns an authorization signal (354) that identifies all of the new content that the user has been authorized to receive since the last authorization request made by the content provider. In this embodiment, it is not necessary that the merchant server 103 know the specific content the user is requesting from the content provider. Rather, the merchant server 103 simply keeps a record of authorization requests it receives from content providers with respect to the user and ensures that the content provider is updated in regard to the content that the user is authorized to access. In some respects, this embodiment may be envisioned as a type of "pull" system in which the content provider initiates a date transfer from the merchant when the user contacts the content provider seeking access to selected content. The merchant server 103 responds with a list of content that has been newly authorized since the last update provided to the content provider.

In response to receiving the authorization signal (354), the content provider server provides access to a media file containing the requested content. The merchant server 103 provides a central control for user access credentials for each content provider server. The user may send an access request to each content provider server to receive a number of different media files containing the requested content and the content provider servers communicate with the merchant server 103 to ensure that user is authorized to receive the requested content.

Other optional implementations of the invention become apparent from the foregoing described embodiments. For example, purchases of selected content from individual content providers 102A, 102B, 102C, and 102D may provide a basis for transmission of a broadcast message to the other content providers of the user's right to access media files containing the selected content from the other content providers. In one particular implementation, a content provider completing a sales transaction for selected content with the user may communicate information regarding the user (e.g., in the form of an account name/password or a previously established token, as described earlier) to the merchant 105, along with an indication of the purchased content, which the merchant 105 may then use to send a message to the other content providers communicating the user's right to access the purchased content.

As illustrated by the above-described embodiments, the present invention allows purchasers of copyright-protected content to receive different files having different file formats of the purchased content without requiring the purchaser to pay multiple times for the separate copies of the content. By providing controlled access to content stored in multiple file formats, the present invention allows users to readily purchase and receive media files that may be played on different desired media player applications. Many other benefits, such as an improved consumer pricing arrangement, may also result from such management of access rights of copyrighted content.

For example, one preferred embodiment of the invention enables users to purchase selected content in a transaction and allows the users to access media files containing the selected content from multiple content providers without having to pay multiple times to access the media files. Pricing arrangements for the selected content should be established such that the merchant, the content providers, and the owner of the copyrighted content are fairly treated. Many compensation models may be devised for use with the invention. The following examples are provided for illustrative purposes, and do not limit the invention.

In one compensation model, the merchant and the copyright owner divide the payment provided by the user and the content providers agree to deliver the selected content upon user request without further charge to the user with the hope of acquiring new customers. In another compensation model, the merchant, the copyright owner, and the content providers each receive a portion of the payment made by the user for the selected content. In yet another compensation model, the user may designate the content providers from whom the user desires to obtain the selected content. There is no charge to the user for delivery of content from a first content provider, but the user may be charged incremental fees for designating additional content providers. In this model, the merchant and the copyright owner may divide the base purchase charge paid by the user with the content providers dividing the additional incremental fees charged to the user for access to two or more content providers.

In still another compensation model, the merchant may receive payment from a user for selected content, of which a portion is shared by the merchant and the copyright owner, and the remaining portion is maintained in an "escrow" account that is paid to the content providers that actually deliver the selected content to the user. The particular formulas used to determine the portions received by the merchant, the copyright owner, and the content providers may vary according to the particular implementation of the invention and the agreements established between the parties.

While several embodiments of the invention have been illustrated and described above, it will be appreciated that various changes can be made therein without departing from the scope of the invention. The scope of the invention should be determined from the following claims and equivalents thereto.

The embodiments of the invention in which an exclusive property or privilege is claimed are defined as follows:

1. A computer-implemented method for managing access to selected content stored in electronic media files having different file formats, comprising:
    under control of instructions that are executed by one or more computer processors in a computing system:
        conducting, in a single purchase transaction, a user purchase of access rights that allow a user to acquire multiple copies of the same selected content in media files having different file formats; and
        communicating an authorization signal to a content provider server of a content provider who did not conduct the purchase transaction, wherein the authorization signal contains information that allows the content provider to authorize the user to acquire, from the content provider server, multiple copies of the same selected content without requiring the user to conduct multiple transactions to purchase access rights for the multiple copies of the selected content, wherein each copy of the selected content acquired from the content provider server is in a media file having a different file format.

2. The method of claim 1, further comprising receiving an authorization request prior to communicating the authorization signal, and communicating the authorization signal to the content provider server in response to receiving the authorization request.

3. The method of claim 2, wherein the authorization request identifies the user and the selected content.

4. The method of claim 2, wherein the authorization request is received from the content provider.

5. The method of claim 2, wherein the authorization request is received from a media player application executing on a client computer associated with the user.

6. The method of claim 5, further comprising identifying the content provider as having the selected content in a media file format that is compatible with the media player application, and communicating the authorization signal to the identified content provider.

7. A tangible computer-readable medium having computer-executable instructions stored thereon for managing access to selected content stored in different file formats, wherein the instructions, if executed, cause a computing device to:
    conduct in a single purchase transaction, a user purchase of access rights that allow a user to acquire multiple copies of the same selected content in media files having different file formats; and
    communicate an authorization signal to a content provider server of a content provider who did not conduct the purchase transaction, wherein the authorization signal contains information that allows the content provider to authorize the user to acquire, from the content provider server, multiple copies of the same selected content without requiring the user to conduct multiple transactions to purchase access rights for the multiple copies of the selected content, wherein each copy of the selected content acquired from the content provider server is in a media file having a different file format.

8. The computer-readable medium of claim 7, wherein the instructions, if executed, further cause the computing device to:
    store transaction information associated with the user purchase in a memory;
    receive an authorization request from the content provider; and
    in response to receiving the authorization request:
        retrieve the transaction information from the memory;
        based on the transaction information, determine whether the user is authorized to access the selected content; and
        communicate the authorization signal to the content provider server.

9. The computer-readable medium of claim 8, wherein the authorization request contains data identifying the user, and wherein the instructions cause the computing device to use the data in the authorization request when determining whether the user is authorized to access the selected content.

10. A computer-implemented method for managing access to selected content stored in electronic media files having different file formats, comprising:
    under control of instructions that are executed by one or more computer processors in a computing system:
        conducting, in a single purchase transaction, a user purchase of access rights that allow a user to acquire multiple copies of the same selected content in media files having different file formats; and
        communicating an authorization signal to multiple content provider servers of multiple content providers who did not conduct the purchase transaction, wherein the authorization signal contains information that allows each of the multiple content providers to authorize the user to acquire, from at least one of the content provider servers, a copy of at least one media file containing the same selected content without requiring the user to conduct multiple transactions to purchase access rights for each copy of the selected content, wherein each copy of the selected content acquired from a content provider server is in a media file having a different file format.

11. The method of claim 10, further comprising receiving an authorization request prior to communicating the authorization signal, and communicating the authorization signal to the multiple content provider servers in response to receiving the authorization request.

12. The method of claim 10, wherein the authorization request identifies the user and the selected content.

13. The method of claim 10, wherein the authorization request is received from the content provider.

14. The method of claim 10, wherein the authorization request is received from a media player application executing on a client computer associated with the user.

15. The method of claim 14, wherein the authorization signal is communicated to at least one content provider server storing the selected content in a media file format that is compatible with the media player application.

16. A computer system for managing access to selected content stored in electronic media files having different file formats, comprising:
   a transaction information database; and
   a merchant server operated by a merchant in communication with the transaction information database, wherein the merchant server is configured to:
      conduct, in a single purchase transaction, a user purchase of access rights that allow a user to acquire more than one copy of the same selected content from more than one content provider, each acquired copy of the selected content being in a different file format such that the user is not required to conduct multiple transactions to purchase access rights for each of the copies of the selected content in the different file formats; and
      communicate an authorization signal to a plurality of content provider servers operated by content providers who did not conduct the purchase transaction, wherein the authorization signal contains information that allows each of the content providers to authorize the user to acquire, from at least one of the content provider servers, a copy of at least one media file containing the same selected content, wherein each copy of the selected content acquired from a content provider server is in a media file having a different file format, and
   wherein the content providers are each different from the merchant and the merchant does not operate the plurality of content provider servers.

17. The system of claim 16, wherein the merchant server is further configured to:
   receive an authorization request for user access to a media file containing the selected content;
   evaluate transaction information in the transaction information database to determine whether the user is authorized to access the media file containing the selected content; and
   communicate the authorization signal to the plurality of content provider servers in response to determining that the user is authorized to access the media file.

18. The system of claim 17, wherein the authorization request is received from the content provider.

19. The system of claim 17, wherein the authorization request is received from a media player application executing on a client computer associated with the user.

20. The system of claim 19, wherein the authorization signal is communicated to a content provider server storing the selected content in a media file format that is compatible with the media player application.

* * * * *